United States Patent [19]

Grassl

[11] 4,397,547
[45] Aug. 9, 1983

[54] LENS MODULE FOR AN OPTO-ELECTRONIC RANGE FINDER

[75] Inventor: Hans-Peter Grassl, Zorneding, Fed. Rep. of Germany

[73] Assignee: Siemens Aktiengesellschaft, Berlin & Munich, Fed. Rep. of Germany

[21] Appl. No.: 238,468

[22] Filed: Feb. 26, 1981

[30] Foreign Application Priority Data

Mar. 12, 1980 [DE] Fed. Rep. of Germany ....... 3009535

[51] Int. Cl.³ ............................ G01C 3/10; G03B 7/08
[52] U.S. Cl. ........................................ 356/1; 350/294; 354/25
[58] Field of Search ...................... 356/1, 4; 354/25 R, 354/25 A, 25 N, 31 R, 31 F; 350/294

[56] References Cited

U.S. PATENT DOCUMENTS

| | | | |
|---|---|---|---|
| 3,689,160 | 9/1972 | Shimulenis et al. | 356/152 |
| 4,037,958 | 7/1977 | Schmidt et al. | 356/4 |
| 4,159,169 | 6/1979 | Sato | 354/31 F |
| 4,184,968 | 1/1980 | Stauffer | 354/25 |
| 4,257,705 | 3/1981 | Hosoe et al. | 356/4 |
| 4,305,657 | 12/1981 | Masunaga et al. | 356/4 |
| 4,313,654 | 2/1982 | Matsui et al. | 356/1 |

FOREIGN PATENT DOCUMENTS 2813913  10/1979  Fed. Rep. of Germany.
2813914  10/1979  Fed. Rep. of Germany.

*Primary Examiner*—S. C. Buczinski
*Attorney, Agent, or Firm*—Hill, Van Santen, Steadman, Chiara & Simpson

[57] ABSTRACT

A lens module for use in an opto-electronic range finder double ray deflection for the projection of two images of an object onto two linear image sensors disposed in a single image plane has a prismatic body having a trapezoidal base with a V-shaped notch in a central area of the longer of the parallel trapezoid sides of the base. The surfaces of the notch are substantially parallel to the nearest non-parallel trapezoid side. A projection from the shorter parallel trapezoid side has a pair of light exit ports leading to the respective image sensors and a pair of light inlet ports are disposed at opposite ends of the longer parallel trapezoid side.

7 Claims, 2 Drawing Figures

LENS MODULE FOR AN OPTO-ELECTRONIC RANGE FINDER

BACKGROUND OF THE INVENTION

1. Field of the Invention

The present invention relates to a lens module for an optoelectronic range finder for projecting two images of an object onto two linear image sensors by double ray deflection.

2. Description of the Prior Art

A lens module for a range finder in an optical camera which operates by the double ray deflection principle for projecting two images of an object onto a single image plane is disclosed in German OS No. 28 13 914. The lens module disclosed therein is also equipped to undertake automatic focusing of the image of the object on the image plane. The lens module disclosed therein consists of four deflecting mirrors and two converging or collecting lenses which must be precisely mounted and adjusted on a chassis plate in order to obtain precise and accurate range finding. The necessity for such precision in assembly and adjustment of the lens module disclosed in German OS No. 28 13 914 makes the module particularly susceptible to mechanical disturbances and frequent readjustment.

SUMMARY OF THE INVENTION

It is an object of the present invention to provide a lens module operating by the double ray deflection principle for projecting two images on an object onto a single image plane which is simple to manufacture and assemble and which does not require constant adjustment and is relatively insensitive to mechanical disturbances.

The above object is inventively achieved in a lens module which essentially consists of a single body of transparent material which undertakes both the function of the beam-deflecting elements in conventional lens modules as well as the function of the light stops or diaphragms. Separate focusing elements are eliminated by the particular design of the surface areas of portions of the transparent body. The linear image sensors, which are preferably integrated on a semiconductor body, can be combined with the transparent body to form a single component.

DESCRIPTION OF THE PREFERRED EMBODIMENTS

Figure 1:
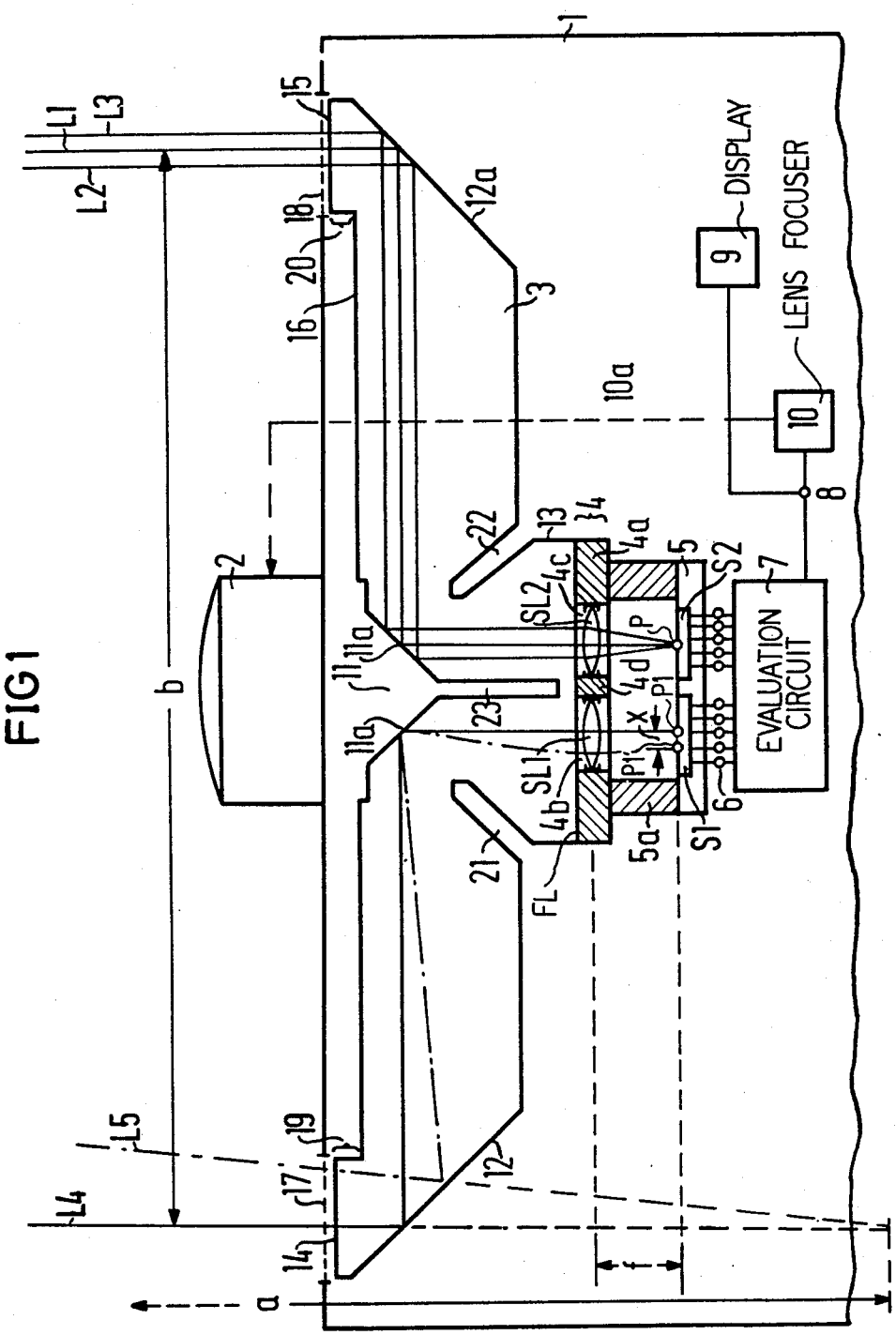
FIG. 1 is a schematic illustration showing a side view of a lens module constructed in accordance with the principles of the present invention connected to relevant components of an electronic range finder.

A portion of a photographic or electronic camera having a housing 1 and a lens 2 is schematically shown in FIG. 1. The components of an opto-electronic range finder which are relevant to the use of the lens module disclosed and claimed herein in the context of such a range finder are also schematically represented. These components will be more fully described below, however, their function is to display the distance of an object from the camera and additionally to adjust the distance of the lens 2 from an object (not shown) such that the image of the object is sharply focused on an image plane within the housing 1.

The lens module constructed in accordance with the principles of the present invention consists of a prismatic body 3 comprised of a transparent material such as, for example, polymethacrylate resin or epoxy resin, which is connected to the housing 1, and an optical means 4 which is secured to the prismatic body 3. The optical means 4 consists of a disc 4a having two apertures 4b and 4c. The apertures 4b and 4c are separated by a center bar 4d. Converging or collecting lenses SL1 and SL2 are respectively mounted in the recesses 4b and 4c. Any lens may be utilized which has the property of collecting incident light rays which are parallel to the axis at a focal point. Two linear image sensors S1 and S2 which are integrated on a doped semiconductor body 5 are disposed in a plane which is perpendicular to the plane of the paper on which FIG. 1 is drawn and which contain the respective focal points of the lenses SL1 and SL2. A spacer 5a is disposed between the disc 4a and the semiconductor body 5 which does not interfere with the incident light.

Each of the image sensors S1 and S2 contains a row of sensor elements which may be photodiodes, MIS capacitors or a combination of photodiodes and MIS capacitors. The structure and manner of functioning of such image sensors is described, for example, in the co-pending United States application Ser. No. 168,648, the teachings of which are incorporated herein by reference. The outputs from the individual sensor elements are referenced at 6 and are respectively connected to parallel inputs of an evaluation circuit 7, the structure and operation of which is also disclosed in Ser. No. 168,648. In general, the image sensors S1 and S2 generate charge packets corresponding to the radiation incident on each of the individual sensor elements thereof which charge packets are transmitted to the evaluation circuit 7 which processes the information to determine when maximum correlation exists between the two received images and this information is transmitted to an output 8 which is connected to a display 9 for visually displaying the distance of the object from the image plane. The output 8 is also connected to an automatic lens focuser of any suitable type which provides a feedback to the lens 2 indicated by the dashed line 10a for moving the lens 2 with respect to the object in order to improve the sharpness of the image. The evaluation circuit 7 may be integrated on the doped semiconductor body 5 as well.

In addition to the embodiment shown in FIG. 1 of the image sensors S1 and S2 in which the individual sensor elements are provided with outputs which are connected to the parallel inputs of the evaluation circuit 7, image sensors may be employed having serial outputs of the type described together with an appropriate evaluation circuit in, for example, German OS No. 28 13 914.

In sum, the prismatic body 3, the optical means 4 including elements 4a through 4d, and the lenses SL1 and SL2 in combination comprise the lens module for the opto-electronic range finder shown in FIG. 1.

In further detail, the prismatic body 3 has a trapezoidal base portion having long and short parallel sides and two angled non-parallel sides. The trapezoidal base of the prismatic body 3 has a V-shaped notch or recess 11 in a central portion of the longer of the two parallel trapezoid sides. The surfaces 11a of the notch 11 are parallel to the respective slanted left side 12 of the prismatic body 3 and the right slanted side 12a of the body 3. The sides 11a of the notch 11 are thus parallel to the closest non-parallel side of the trapezoidal base of the body 3.

The prismatic body 3 also has a projection 13 extending from the trapezoidal base in a central area of the shorter of the two parallel trapezoid sides, that is, the side of the prismatic body 3 away from the lens 2. The lateral surface 16 of the longer parallel side of the trapezoidal base of the body 3 has projections 14 and 15 extending toward the lens 2 and the object to be focused which are disposed at opposite ends of the longer side of the trapezoidal base and which are situated behind aperture diaphragms 17 and 18 of the housing 1. The projections 14 and 15 are entrance ports through which light rays penetrate into the lens module, and are raised above the lateral surface 16 to a distance respectively designated by offsets 19 and 20. The diaphragms 17 and 18 may be of any type known to those skilled in the art and are not shown in greater detail in the drawings.

The operation of the lens module is as follows. Light rays such as those schematically shown as L1, L2 and L3 proceed in the direction of the optical axis of the lens module from an object situated at a large distance therefrom, which light rays are deflected by 90° at the surface 12a and arrive at the right lateral surface 11a, where the rays are again deflected by 90°. In order to insure substantially total reflection of the incident light rays at the surfaces 12a and 11a, as well as at the surface 12, the surfaces are extremely smooth or are mirrored. The twice deflected rays L1, L2 and L3 are then refracted in the convergent lens SL2 in such a manner that the rays meet at a point P of the image sensor S2. After double deflection at the surface 12 and the left lateral surface 11a, a light ray L4, which also proceeds from the object, arrives at the lens SL1 and is incident on the sensor S1 at a point P1. The light ray L4 is also assumed to arrive from an object situated at a large distance from the lens module.

If one now assumes that the object in the direction of the light rays L1 through L3 is situated at such a distance from the module that in fact the light ray L5, shown in dashed lines in FIG. 1, represents the position or direction of the object instead of the light ray L4, the light ray L5 is incident by the same double deflection principle at a point P1' on the image sensor S1. The distance x between the points P1 and P1', by which the image of the object projected onto the plane of the image sensors S1 and S2 has been displaced in comparison to the image of the object at a large distance, represents a measure for the actual distance of the object. If the distance between the centers of the two entrance ports represented by the projections 14 and 15 is designated as a base length b, the focal length of the lens SL1 or SL2 as f, the distance of the object measured from the point of intersection of the light rays L4 and L5 as a, and the index of refraction of the transparent material comprising the prismatic body 3 as n, the following relationship represents the value of x:

$$x = \frac{b \cdot f}{a \cdot n}.$$

An identical displacement y of the image points of the objects projected onto the second image sensor S2 is present in comparison to the corresponding image points of the object situated at a large distance from the module when the object is no longer situated in the direction of the light rays L1 through L3. For simplicity, the light rays resulting in such a displacement y are not illustrated in FIG. 1, however, it will be understood that the displacement y results in identical fashion as that described for x. The sum of the displacements x+y represents a measure for the actual distance of the object from the module.

The value x+y is determined in the evaluation circuit 7 in such a manner that the sensor signals of the image sensor S1 are examined with the sensor signals from the image sensor S2 with respect to their correlation as a function of different position displacements. The position displacement at which the maximum correlation occurs corresponds to the value x+y which is sought. An electrical magnitude can then be tapped at the output 8 which corresponds to the value and thus represents the distance of the object. As stated above, the manner of functioning of such an evaluation circuit is described, for example, in the co-pending United States application Ser. No. 168,648, however, it will be understood that the precise manner of functioning of the sensors S1 and S2 and the evaluation circuit 7 is not necessary to an understanding of the operation of the lens module.

The boundary surface between the projection 13 of the prismatic body 3 and the optical means 4 is referenced at F1, and those areas of the surface F1 disposed adjacent to the apertures 4b and 4c are exit ports for the lens module. Except for the areas of the projections 14 and 15 serving as entrance ports, the surfaces 11a, 12 and 12a and the exit ports in the surface FL, the surface of the prismatic body 3 should be as rough as possible and should also be blackened in order to substantially suppress scatter and other false light influences. To this end, notches 21 and 22 disposed on opposite sides of the projection 13 and a notch 23 extending from an apex of the notch 11 into the projection 13 function as optical stops or diaphragms to further reduce extraneous unwanted light influences.

Figure 2:
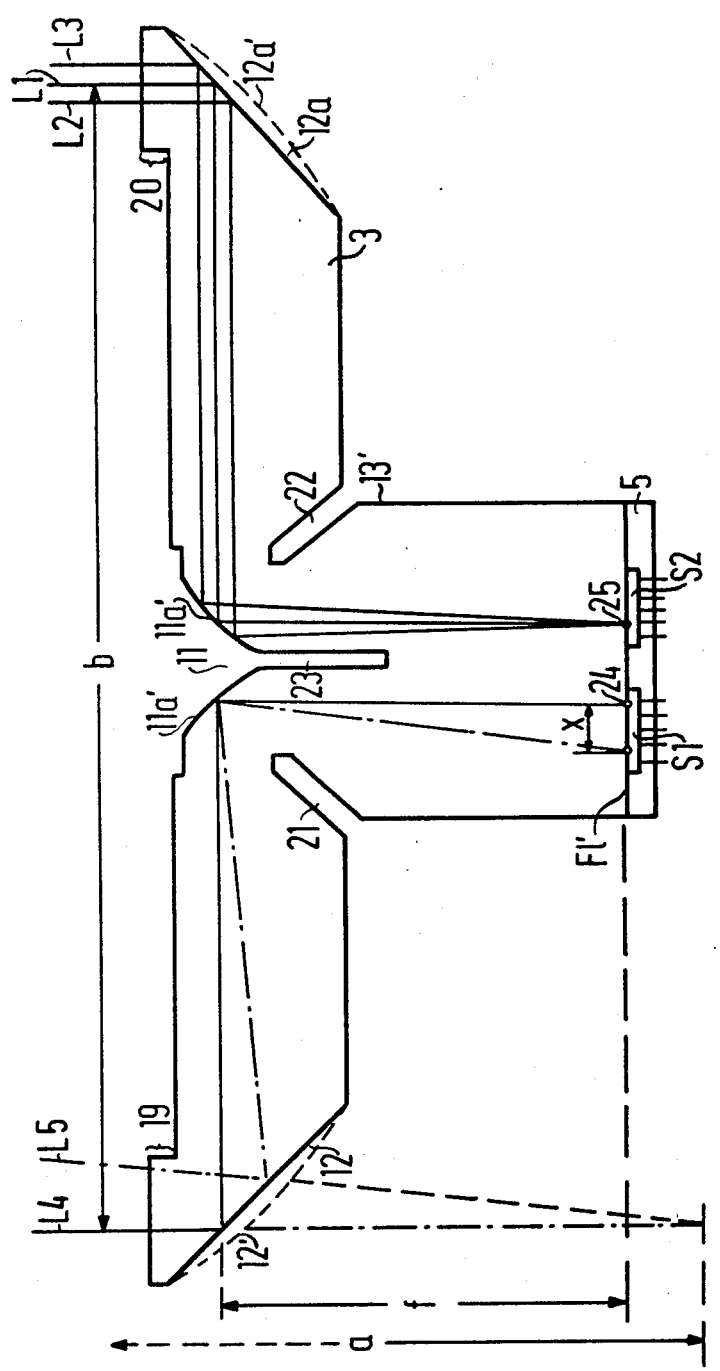
FIG. 2 is a schematic illustration in side view of a further embodiment of the lens module of FIG. 1 having selected surfaces thereof designed for improved focusing of the object image.

A further development of the lens module is shown in FIG. 2 wherein the notch 11 has focusing lateral surfaces 11a' in place of the planar lateral surfaces 11a in the embodiment of FIG. 1. The focusing lateral surfaces 11a have the effect of a convergent or collecting lens with respective focal points 24 and 25. In place of the projection 13 shown in FIG. 1, the embodiment of FIG. 2 employs an elongated projection 13' having a boundary surface F1' which is perpendicular to the plane of the drawing of FIG. 2 and which contains the focal points 24 and 25. The optical means 4, present in the embodiment of FIG. 1, is eliminated in the embodiment of FIG. 2 and the image sensors S1 and S2 integrated on the doped semiconductor body 5 are disposed in direct contact with the surface F1'. The semiconductor body 5 can thus be combined with the prismatic body 3 in a single component. The relationship derived above for the embodiment of FIG. 1 for determining the value of x and y also is applicable to the embodiment shown in FIG. 2, however, the focal length f is equal to the distance from the center of either lateral focusing surface 11a' to the boundary surface F1'.

The desired focusing by means of the focusing lateral surfaces 11a' is achieved when these surfaces are designed as concave mirrors, for example, as sections of the surfaces of two paraboloids whose respective axes are disposed in the plane of the boundary surface F1'. It will also suffice for many applications if the lateral surfaces 11a' are sections of two spherical surfaces or sections of the surfaces of two ellipsoids whose major axes are disposed in the plane of the boundary surface F1'.

The focusing effect of the surfaces 11a' can be further increased when, in place of the planar surfaces 12 and 12a shown in FIG. 1, concave surfaces 12' and 12a' as shown in FIG. 2 are employed which are designed as concave mirrors and which may also be sections of paraboloid, ellipsoid, or spherical surfaces.

The lens module disclosed and claimed herein may be employed not only in conjunction with a range finder built into a photographic or electronic camera, but also may be employed in any opto-electronic range finding device such as may be used, for example, for measuring the position of a workpiece to be handled in a tool machine, for measuring the distance or relative velocity of two vehicles, or other devices requiring telemetric measurements as will be apparent to those skilled in the art.

Although other modifications and changes may be suggested by those skilled in the art it is the intention of the inventor to embody within the patent warranted hereon all changes and modifications as reasonably and properly come within the scope of his contribution to the art.

I claim:

1. A lens module for double deflection of incident light from an object for projecting two images of the object respectively on two linear image sensors of an opto-electronic range finder, said image sensors being disposed in a single image plane, said lens module comprising a prismatic body consisting of transparent material having a trapezoidal base with a longer side disposed nearer said object and a parallel shorter side and two non-parallel angled sides, said base having a V-shaped notch in a central portion of said longer side, said notch having concave lateral surfaces, said prismatic body further having a projection extending from a central portion of said shorter side of said base, said projection having two spaced light exit ports at a bottom thereof, and said prismatic body further having two light entrance ports disposed at opposite ends of said longer side, whereby light from said object enters said lens module through each of said light entrance ports and is doubly deflected by each of said non-parallel sides of said base and the lateral concave surfaces of said V-shaped notch toward said light exit ports and is simultaneously focussed at said respective light exit ports by said lateral concave surfaces.

2. The lens module of claim 1 wherein said non-parallel sides of said base are concave mirrors curved for focussing said light from said object onto said lateral surfaces of said V-shaped notch.

3. The lens module of claim 1 wherein the module has an outer surface which is blackened and rough for preventing stray light influences except in the area of said light entrance ports, said light exit ports, said non-parallel sides of said base and said lateral surfaces of said V-shaped notch.

4. The lens module of claim 1 wherein said non-parallel sides of said base and said lateral surfaces of said V-shaped notch are smooth and mirrored.

5. The lens module of claim 1 wherein said linear image sensors are integrated on a semiconductor body and wherein said semiconductor body is mounted on said projection of said lens module to form a single component.

6. A lens module for double deflection of incident light from an object for projecting two images of the object respectively on two linear image sensors of an opto-electronic range finder, said image sensors being disposed in a single image plane, said lens module comprising a prismatic body consisting of transparent material having a trapezoidal base with a longer side disposed nearer said object and a parallel shorter side and two non-parallel angled sides, said base having a V-shaped notch in a central portion of said longer side, said notch having lateral surfaces which are respectively substantially parallel to a nearest of said non-parallel angled sides, said prismatic body further having a projection extending from a central portion of said shorter side of said base and having corners where said projection meets said shorter side and having a pair of angled notches extending from said corners toward the interior of said lens module for minimizing stray light influences, said projection having two spaced light exit ports at a bottom thereof, and said prismatic body further having two light entrance ports disposed at opposite sides of said longer side, whereby light from said object enters said lens module through each of said light entrance ports and is doubly deflected by each of said non-parallel sides of said base and the lateral surfaces of said V-shaped notch toward said light exit ports.

7. A lens module for double deflection of incident light from an object for projecting two images of the object respectively on two linear image sensors of an opto-electronic range finder, said image sensors being disposed in a single image plane, said lens module comprising a prismatic body consisting of transparent material having a trapezoidal base with a longer side disposed nearer said object and a parallel shorter side and two non-parallel angled sides, said base having a V-shaped notch in a central portion of said longer side and a straight notch extending toward the interior of said module from an apex of said V-shaped notch in a direction substantially perpendicular to said longer and shorter parallel sides of said base, said notch having lateral surfaces which are respectively substantially parallel to a nearest of said non-parallel angled sides, said prismatic body further having a projection from a central portion of said shorter side of said base, said projection having two spaced light exit ports at a bottom thereof, and said prismatic body further having two light entrance ports disposed at opposite sides of said longer side, whereby light from said object enters said lens module through each of said light entrance ports and is doubly deflected by each of said non-parallel sides of said base and the lateral surfaces of said V-shaped notch toward said light exit ports.

* * * * *